United States Patent [19]
Scott

[11] 4,097,945
[45] Jul. 4, 1978

[54] FOLDING GARDEN TOOL

[75] Inventor: Bill B. Scott, Weston, Conn.

[73] Assignee: Pfizer Inc., New York, N.Y.

[21] Appl. No.: 790,020

[22] Filed: Apr. 22, 1977

[51] Int. Cl.² .............................................. B25F 1/00
[52] U.S. Cl. ............................................ 7/116; 7/158
[58] Field of Search ...................... 7/18, 16, 14.55; 81/177 E; 294/2, 51

[56] References Cited

U.S. PATENT DOCUMENTS

| | | | |
|---|---|---|---|
| 429,515 | 6/1890 | Fred | 7/1 B |
| 2,873,460 | 2/1959 | Delpierre | 7/14.55 |
| 3,074,752 | 1/1963 | Kirkel | 7/14.55 X |

FOREIGN PATENT DOCUMENTS

| | | | |
|---|---|---|---|
| 696,932 | 11/1969 | Canada | 7/14.55 |

Primary Examiner—James L. Jones, Jr.
Assistant Examiner—James G. Smith
Attorney, Agent, or Firm—Connolly and Hutz

[57] ABSTRACT

A folding garden tool particularly adapted for indoor use includes several miniature implements hinged together at their rear ends which also provide useful functions. A miniature scoop and combination rake and aerator have a combination spike and serrated cutter knife pivoted between them. The forward ends of the scoop and rake nest together to house the spike and knife. The rear ends of the scoop and rake provide cooperating halves of a tamper when aligned with each other and the combination spike has a knife shaped rear end that cooperates with a recess in the end of the rake to provide a pruner. All sharp surfaces of the combination spike are shielded in the folded or aligned condition of the tool.

4 Claims, 6 Drawing Figures

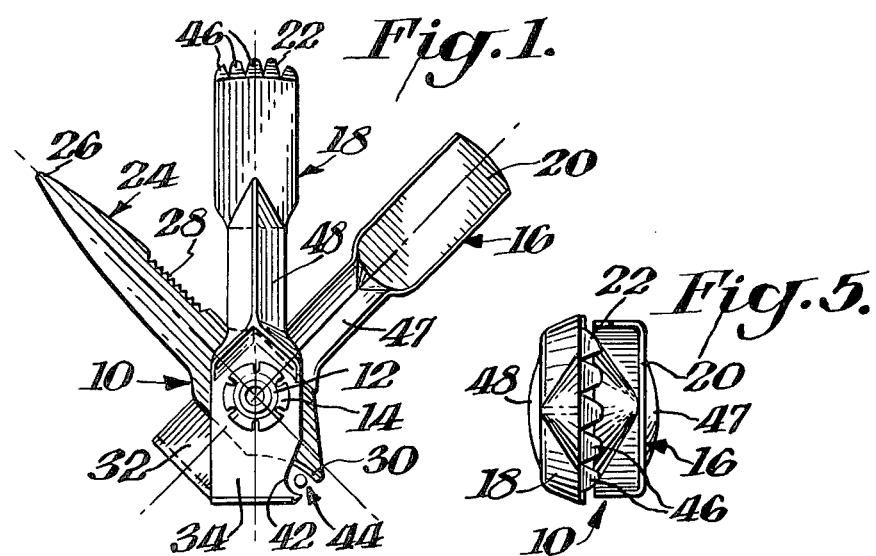
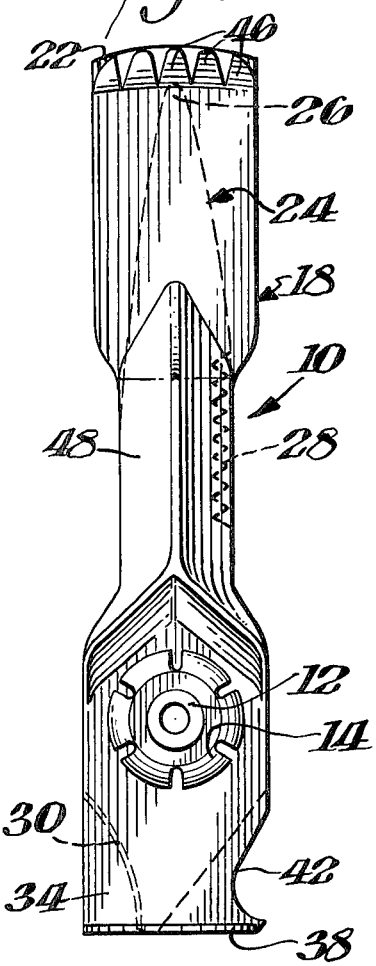
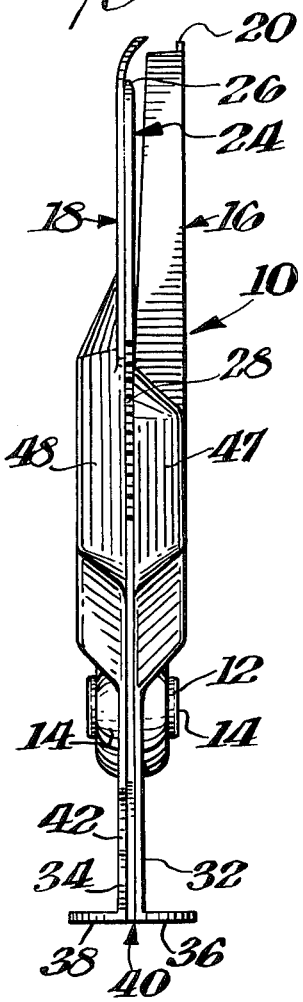
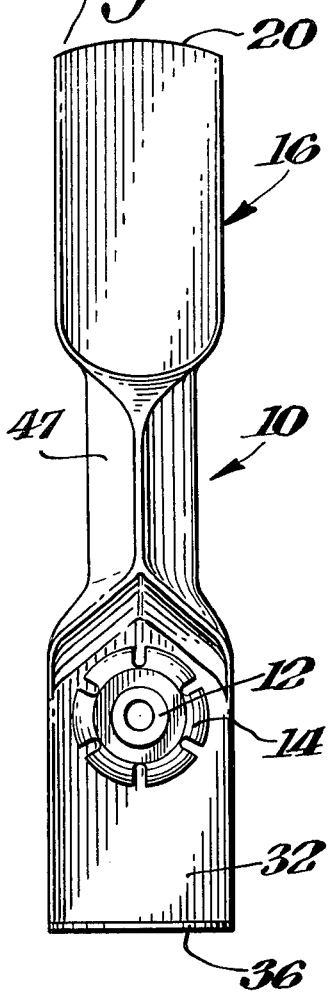
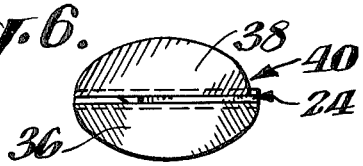

FOLDING GARDEN TOOL

BACKGROUND OF THE INVENTION

Various full size garden tools and landscaping implements are available, which provide a multiplicity of functions. It is an object of this invention to provide a simple and efficient combination of miniature garden tools which provide a multiplicity of functions for the indoor gardener.

SUMMARY

In accordance with this invention a miniature pair of garden implements, particularly suitable for indoor gardening include a pair of implements with substantially blunt edges pivoted together about a sharp knife edged implement. The outer blunt implements comprise, for example, a scoop and a rake whose blunt opposite angular ends together constitute a tamper when aligned with each other. The knife implement pivoted in between the scoop and rake includes, for example, a spike and a serrated cutter on its forward end and a sharp pruning cutter on its rear end. One of the rear ends of the scoop or rake has a recess which cooperates with the rear cutting knife of the spike to provide a pruner for small stems or branches.

BRIEF DESCRIPTION OF THE DRAWINGS

Novel features and advantages of the present invention will become apparent to one skilled in the art from a reading of the followig description in conjunction with the accompanying drawing wherein similar reference characters refer to similar parts and in which:

FIG. 1 is a front elevational view of indoor garden tool partially opened, which is one embodiment of this invention;

FIG. 2 is a front elevational view of indoor garden tool closed, which is one embodiment of this invention;

FIG. 3 is a side elevational view of the tool shown in FIGS. 1-2;

FIG. 4 is a rear elevational view of the tool as shown in FIGS. 1-3;

FIG. 5 is a top plan view of the tool shown in FIGS. 1-4; and

FIG. 6 is a bottom plan view of tool shown in FIGS. 1-5.

DESCRIPTION OF THE PREFERRED EMBODIMENTS

In FIG. 1 is shown indoor garden tool 10 in a partially opened condition to illustrate the full array of implements. Garden tool 10 includes the following miniature implements pivoted together on shaft 12 and secured to it by staked washer nut 14. The outer implements of tool 10 comprise a miniature scoop 16 and a combination rake and aerator 18 having front operative ends 20 and 22 respectively, which substantially nest together in the closed condition shown in FIGS. 2-5 to form a housing for sharp edged central implement 24 which, for example, includes from forward to rear ends spike 26, serrated cutting knife 28 and rear knife edge 30. The short pivoted rear end 32 of scoop 16 and 34 of rake 18 have a right angular section 26 and 38 extending outwardly to form a tamper 40 between them. The short rear end 34 of rake 18 has a recess 42 which cooperates with cutter edge 30 to form a pruner 44 between them. The end teeth 46 on rake 22 may also serve as a miniature aerator.

When tool 10 is folded together as shown in FIGS. 2-5, all sharp surfaces are housed between miniature scoop 20 and rake 18. In this position tool 10 may be conveniently carried or used as a tamper. In the open condition shown in FIG. 1, each of the implements can be separately used and spike 26 and rake 22 can be manipulated to utilize pruner 44.

Scoop 20 and rake 18 have channeled shank 47 and 48 respectively at their mid-sections to facilitate comfortable gripping of the implement during use and to strengthen them.

The garden tool although specifically designed for indoor gardeners, could be a valuable garden aid in setting out force grown vegetable plants in the spring.

I claim:

1. A folding combination garden tool primarily useful for indoor use comprising a pair of implements having substantially blunt edges and longer forward and shorter rear ends, a pair of cooperating tamper elements disposed adjacent each other on the shorter ends of the implements having substantially blunt edges, pivot means disposed adjacent the shorter rear ends of the implements whereby they may be pivoted in line or apart from each other, an implement having sharp edges constituting it as a cutting implement disposed and pivoted in between the implements having substantially blunt edges, the cutting implement has relatively sharp edges including a longer front end and a short rear end, the shorter rear end of the cutting implement having a short cutting edge on a side of its shorter rear end, a recess in at least one of the shorter rear end of the substantially blunt implements for cooperating with the short cutting edge to provide a pruner, the substantially blunt implements in the aligned condition providing a tamper at their shorter rear ends and housing the cutting element between their longer front ends, and the implements having substantially blunt edges comprise at their forward ends a scoop and a rake.

2. A device as set forth in claim 1 wherein the scoop and the rake have substantially flat outer surfaces to prevent snagging.

3. A device as set forth in claim 2 wherein shorter ends of the substantially blunt implements having right angular feet, which constitute the tamper elements and operatively provide a tamper when disposed together.

4. A device as set forth in claim 1 wherein the implements having substantially blunt edges have channeled shanks.

* * * * *